United States Patent
Das et al.

(10) Patent No.: US 11,284,273 B2
(45) Date of Patent: Mar. 22, 2022

(54) ACCESS POINT CENTRIC CONNECTIVITY MAP SERVICE

(71) Applicant: Federated Wireless, Inc., Arlington, VA (US)

(72) Inventors: Deepak Das, Lexington, MA (US); Rohan Grover, Medford, MA (US); Sumit Machwe, West Roxbury, MA (US)

(73) Assignee: FEDERATED WIRELESS, INC., Arlington, VA (US)

( * ) Notice: Subject to any disclaimer, the term of this patent is extended or adjusted under 35 U.S.C. 154(b) by 30 days.

(21) Appl. No.: 16/996,271

(22) Filed: Aug. 18, 2020

(65) Prior Publication Data

US 2022/0060904 A1 Feb. 24, 2022

(51) Int. Cl.
| | |
|---|---|
| *H04W 16/14* | (2009.01) |
| *H04W 28/24* | (2009.01) |
| *H04W 36/14* | (2009.01) |
| *H04W 48/18* | (2009.01) |
| *H04L 12/24* | (2006.01) |
| *H04L 12/26* | (2006.01) |
| *H04L 43/0811* | (2022.01) |
| *H04L 41/12* | (2022.01) |

(52) U.S. Cl.
CPC ............ *H04W 16/14* (2013.01); *H04L 41/12* (2013.01); *H04L 43/0811* (2013.01); *H04W 28/24* (2013.01); *H04W 36/14* (2013.01); *H04W 48/18* (2013.01)

(58) Field of Classification Search
CPC ..... H04W 16/14; H04W 28/24; H04W 36/14; H04W 48/18; H04L 41/12; H04L 43/0811
USPC .......................................................... 370/329
See application file for complete search history.

(56) References Cited

U.S. PATENT DOCUMENTS

2002/0064336 A1* 5/2002 Graves .................. G02B 6/359
385/17

* cited by examiner

*Primary Examiner* — Inder P Mehra
(74) *Attorney, Agent, or Firm* — Finnegan, Henderson, Farabow, Garrett & Dunner, LLP

(57) ABSTRACT

Methods and systems for providing a connectivity map to a user equipment (UE) in a wireless network are disclosed. Exemplary methods comprise receiving a request for connectivity information from the UE, sending the request for connectivity information to a connectivity map service application program interface (API), receiving, from the connectivity map service API, a connectivity map, and sending the connectivity map to the UE in response to the request for connectivity information. The connectivity map may be generated using a location and state information associated with one or more nearby APs stored in a database and may comprise a list of available spectrum and one or more parameters associated with each available spectrum. The connectivity map may be used to select at least one of a network, a data-path, a network route, a connectivity strategy, or a spectrum for the UE.

24 Claims, 4 Drawing Sheets

| | | | |
|---|---|---|---|
| | AP or Radio Device ID 3100 | Location 3200 | Service Provider 3300 |

| Parameters | Band 1 Channel 3400 | Band 2 Channel 3400 |
|---|---|---|
| Availability 3410 | ... | ... |
| Authorization 3420 | ... | ... |
| Coverage 3430 | ... | ... |
| Capacity 3440 | ... | ... |
| Loading 3450 | ... | ... |
| QoS Support 3460 | ... | ... |
| Reliability 3470 | ... | ... |
| Radio Features Support 3480 | ... | ... |
| Standards Support 3490 | ... | ... |
| Cost 3500 | ... | ... |
| Security Req. 3510 | ... | ... |
| Access Req. 3520 | ... | ... |
| Other 3530 | ... | ... |

ACCESS POINT CENTRIC CONNECTIVITY MAP SERVICE

FIELD OF INVENTION

The present invention relates to techniques for providing connectivity intelligence in wireless networks and, more particularly, to methods and systems for providing a connectivity map to a user equipment (UE) in a wireless network.

BACKGROUND

The radio frequency (RF) spectrum is in use by many wireless communications systems today, including radar and cellular communications systems. Specified frequency ranges, sometimes identified as bands or channels, in the RF spectrum may be allocated for use by different entities, for different purposes, or in different geographic locations. As used in this disclosure, "spectrum" refers to any frequencies, frequency bands, and frequency channels in the RF spectrum that may be used or allocated for wireless communications.

Because the available RF spectrum is finite, frequency allocations in the spectrum are highly valued and often highly regulated. In the United States, for example, the Federal Communications Commission (FCC) and the National Telecommunication and Information Administration (NTIA) regulate and manage spectrum allocations, allotments, and assignments. Frequency allocation is the process by which the entire RF spectrum is divided into frequency bands established for particular types of service. These frequency allocations are then further subdivided into channels designated for a particular service or "allotment." Assignment refers to the final subdivision of the spectrum in which a party (i.e., cellular operator) receives one or more frequency assignments, in the form of a license, to operate a radio transmitter on specific frequency channels within a particular geographic location.

The system of spectrum allocation, allotment, and assignment is failing to keep pace with the increasing demand for spectrum. There is, therefore, a need to improve how the available spectrum can be efficiently allocated, allotted, and assigned in the face of growing demand. Unless otherwise noted, "allocation" is used in the present disclosure to generally refer to the process by which spectrum is allocated, allotted, and assigned.

In view of this increasing demand for spectrum, a dynamic spectrum access (DSA) system may be used to share available spectrum among multiple users. A DSA system, for example, may include a Spectrum Access System (SAS) that manages access to a shared spectrum, such as the Citizens' Band Radio Service (CBRS) band at 3.5 GHz recently made available for commercial use in the United States. In another example, a DSA system may be used to share access to unlicensed spectrum, such as Television Whitespace (TVWS). Coordinating and managing multi-user access to a shared spectrum present challenges in a DSA system.

Conventionally, the SAS can also provide radio channel maps or spectrum availability maps to a network node. A network node may be any device configured to communicate over the network, including for example, any type of user equipment (such as mobile devices, computers, smartphones, tablets, laptops, etc.), access points, servers, routers, switches, gateways, or other computing devices connected to the network. However, conventional techniques for providing radio channel maps or spectrum availability maps suffer several shortcomings. For example, conventional radio channel maps or spectrum availability maps that networks can provide connectivity on generally refer to static maps showing spectrum availability (e.g., licensed spectrum) across a geographical region. Such static maps of spectrum availability are tied to geographical locations, such as census tracts, and are not tied to access points (APs) near the location. Accordingly, such static maps of spectrum availability may not necessarily reflect the dynamic availability of spectrum or connectivity options that are available to the APs. As used herein, one or more APs may include one or more radios where each radio may be assigned to a separate frequency and each may be controlled separately. As used herein, the terms AP and radio may be substituted for one another.

In some cases, the actual availability of spectrum or connectivity options for APs may dynamically change due to dynamic protection of "incumbent users," such as military or other government users, that had access to a spectrum before that spectrum was shared with other "non-incumbent" users, such as the activation of a Dynamic Protection Area (DPA) in the CBRS band. As used herein, a "user" may refer to a user equipment (such as a mobile phone) or to a person using a user equipment as will be apparent in context. In addition, the actual availability of spectrum or connectivity options for APs may dynamically change due to dynamic spectrum use by higher-priority spectrum owners or "primary users" in shared bands, such as Priority Access License (PAL) owners in the CBRS band. Moreover, the actual availability of spectrum or connectivity options for APs may dynamically change due to coexistence reasons, such as managed reallocation of spectrum to mitigate inter-radio interference. While the actual availability of spectrum or connectivity options for APs may be dynamically changing, dynamic availability of spectrum is not reflected in static spectrum availability or channel maps.

SUMMARY

Embodiments of the present disclosure overcome the disadvantages of the prior art by providing dynamic connectivity intelligence across multiple bands in order to optimize the use of available spectrum. As discussed above, CBRS shared-spectrum systems are currently being deployed to provide commercial use of 150 MHz of spectrum in the 3.5 GHz band, and new bands such as the 6 GHz band (5.925 to 7.125 GHz) may soon be available for shared spectrum use. Currently, SAS providers manage the sharing of the CBRS band at 3.5 GHz, and in the future may manage multiple other shared bands. As such, SAS providers are in a unique position to identify connectivity options, such as spectrum or channels, within each of the shared bands that are available to APs at any given time. Further, the SAS may not only know which channels the APs are authorized to transmit on, but may also be able to determine which channels the APs could acquire authorization to transmit on in the imminent future with real-time or near real-time measurements from the APs. Accordingly, the SAS may be configured to provide connectivity intelligence across multiple bands of shared spectrum available to each AP the SAS manages, thereby facilitating a more optimized use of spectrum.

According to some illustrative embodiments herein, a connectivity map service application program interface (API) may be configured to create, store, and maintain a connectivity map for each AP or each radio in a shared spectrum band, such as the CBRS band, at any given time. The connectivity map may reflect the channels that are available to an AP based on a location of the AP, presence of incumbents, the channels on which the AP can be authorized to transmit, and/or the maximum transmit power that is authorized for the channels. The channels as well as the transmit power available to the AP can be dynamically changing. Accordingly, the dynamic connectivity map may help the SAS meet customer requirements around providing channels to APs immediately without waiting for official updates, such as Cooperative Periodic Activities among SASs/Iterative Allocation Process (CPAS/IAP).

Moreover, APs in the future may be multi-mode APs that can support Wi-Fi, CBRS, as well as other shared bands (e.g., 6 GHz). Similarly, there may be end user devices, such as UEs, that can also be multi-mode, supporting Wi-Fi, CBRS, as well as other shared bands (e.g., 6 GHz). Accordingly, it may be beneficial for UEs to have access to details about the spectrum bands and connectivity options, to which various APs have real-time access. It may also be beneficial for UEs to know whether the APs are already authorized or will be authorized to transmit in the available spectrum bands.

For example, a complex user application on a multi-mode UE may prefer to send the best-effort traffic flow for the application over Wi-Fi, video traffic flow for the application over the CBRS band with a predetermined quality of service (QoS), and large file transfer for the application over the 6 GHz band. In such cases, it may be helpful for such an application to know which spectrum or connectivity options are available on an AP, to which the radio may want to connect. Real-time information of the spectrum or, in general, connectivity options available to the AP may help the application and other end user applications to opportunistically use the available spectrum channels in an optimal manner.

In addition, knowing the connectivity options available to a given AP can be valuable in mobility scenarios, in which an end user device may decide for or against connecting to a particular AP depending on the AP's currently authorized spectrum or, in general, connectivity options that are currently available to the AP. Therefore, providing connectivity options information for each AP as a channel or connectivity map may allow the SAS to utilize and allocate shared spectrum efficiently and optimally.

In some embodiments, a real-time or near real-time connectivity map created and maintained for each AP may be stored in a database. Information stored in the database may be comprehensive with regards to the connectivity options and information may be updated periodically such that the connectivity information provided is real-time or near real-time. In some embodiments, the connectivity map created and maintained for each AP may be provided via secure and scalable access such that both the internal (e.g., SAS) application as well as external applications or entities may have access to the connectivity map. For example, an Identity Management System may be configured to check for authentication and authorization of the application, whether internal or external, that is requesting the connectivity information prior to providing access to the connectivity information (e.g., connectivity map). In other embodiments, the connectivity map service API may be configured to provide intelligence information beyond the connectivity options that are available for each AP. For example, the connectivity map service API may be configured to provide additional intelligence information, such as spectrum coverage, spectrum capacity, quality of service (QoS) associated with the spectrum, spectrum availability in time and location, spectrum loading, spectrum cost, spectrum reliability, features supported by the spectrum, standards supported by the spectrum, security requirement associated with the spectrum, or authentication requirement associated with the spectrum. In some embodiments, the location may be a location of one or more nearby APs or another location that is different from a location of the UE.

In some embodiments of the present disclosure, a machine-learning-based algorithm ("ML algorithm") may be implemented. The ML algorithm may be implemented a standalone or distributed program, and may be part of a larger software module, application, or service running on one or more network nodes. For example, the ML algorithm may be implemented as a cloud-based service. In some embodiments, the ML algorithm may be used to provide optimal connectivity options to the AP based on predicted behavior of networks. The ML algorithm may be configured to optimize spectrum allocation by the SAS and/or spectrum usage by the network nodes. For example, the ML algorithm may be used to predict when certain currently unavailable channels or connectivity options may become available in the near future based on historical behavior of an AP. Accordingly, the ML algorithm may provide immediate or best-effort service based on the user's or UE's priority.

In some embodiments, the ML algorithm may also be used to provide a predicted availability schedule for separate channels based on historical data. In other embodiments, the ML algorithm may be used to predict QoS of each spectrum or channel at different times of the day for different APs based on historical data. Based on the prediction from the ML algorithm, the SAS may be able to optimize its spectrum allocation in the network. In addition, based on the prediction from the ML algorithm, the connectivity map service API may be able to provide optimal connectivity options for the UEs. Accordingly, a UE may be able to select an optimal network, an optimal data-path, an optimal network route or connectivity route, or an optimal connectivity strategy for itself.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this disclosure, illustrate various exemplary disclosed embodiments. In the drawings:

FIG. 3 illustrates an exemplary intelligence information provided by a connectivity map service application programming interface (API) in accordance with the disclosed embodiments.

DETAILED DESCRIPTION OF DISCLOSED EMBODIMENTS

Figure 1:
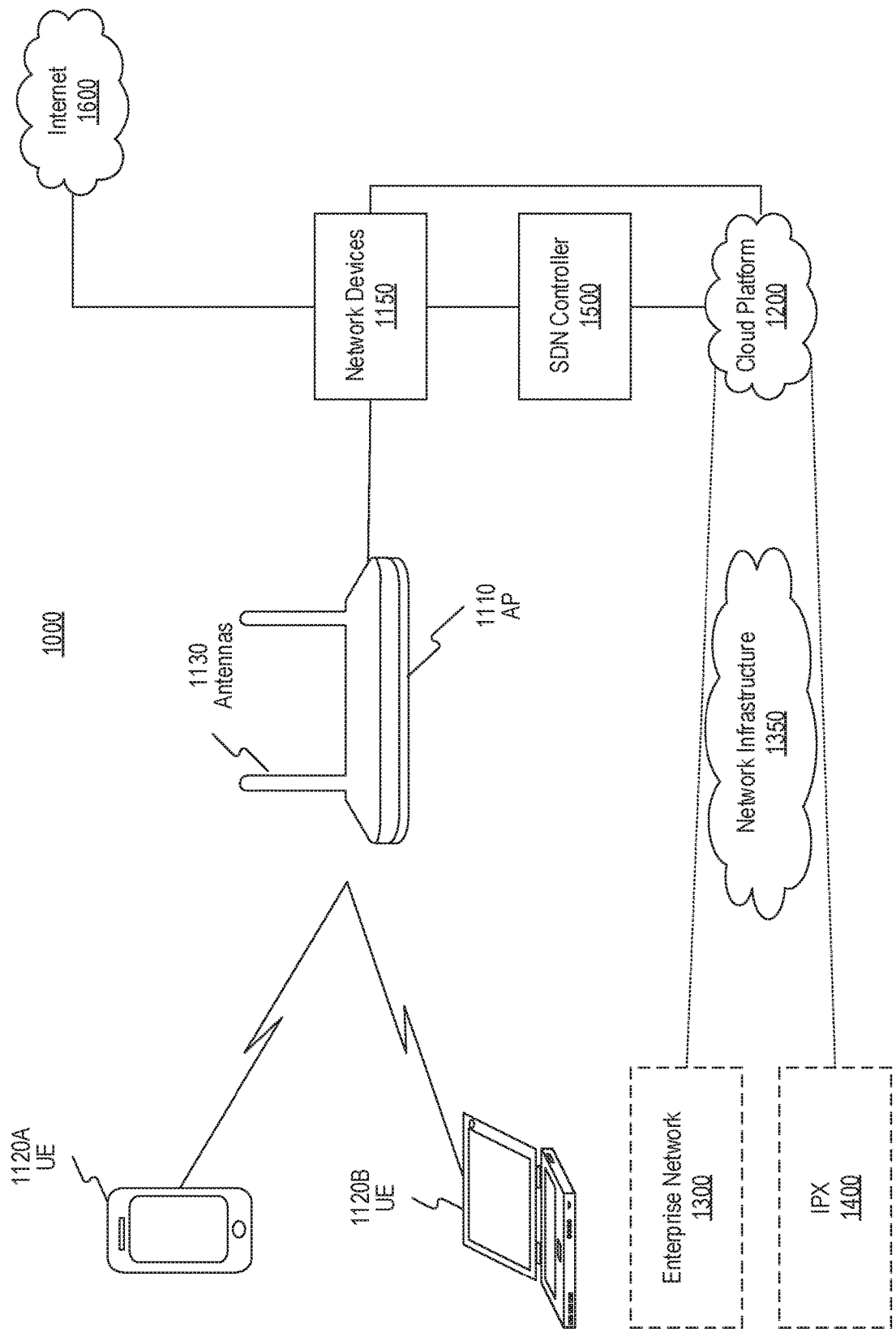
FIG. 1 illustrates a schematic block diagram of an exemplary cloud-based wireless access infrastructure in accordance with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 illustrates a schematic block diagram of an exemplary cloud-based wireless access infrastructure 1000 in accordance with the disclosed embodiments of the present disclosure. The exemplary cloud-based wireless access infrastructure 1000 may provide one or more access points (AP) 1110 through which users may communicate to access standardized wireless voice and/or data services, for example the LTE standard, as well as enterprise-level applications and services that would be available to the user in an enterprise network of a corporate, governmental, academic, non-profit, or other organization or entity. For example, in accordance with the disclosed embodiments, an organization may deploy a WiFi-, cellular-, and/or CBRS-based AP 1110 in a building to provide its employees in that building with wireless access to both LTE and enterprise-level services. In some embodiments, the UEs 1120A-B may communicate via terrestrial or satellite-based systems. The exemplary cloud-based wireless access infrastructure 1000 may include at least first and second UEs 1120A-B, one or more antennas 1130, one or more APs 1110, one or more network devices 1150, a network controller 1500, a cloud platform 1200, an enterprise network 1300, and an internal protocol exchange (IPX) 1400.

As shown in FIG. 1, each of the UEs 1120A-B may communicate with the AP 1110 through the antenna 1130 electrically coupled to the AP 1110. In some embodiments, each of the UEs 1120A-B may communicate with more than one AP 1110 in the network. While a single antenna is shown in FIG. 1, the cloud-based wireless access infrastructure 1000 may alternatively employ multiple antennas, each electrically coupled to the AP 1110. In some embodiments, one or more antennas 1130 may connect to the AP 1110 and other antennas may connect to different APs in the same wireless access infrastructure. The AP 1110 may be implemented on one or more computer systems. The AP 1110, for example, may execute one or more software programs on a single computer or on a cluster of computers. Alternatively, the AP 1110 may be implemented as one or more software programs executing on one or more virtual computers.

In the disclosed embodiments, the AP 1110 may be connected to one or more network devices 1150, which may be configured to forward data between the UEs 1120A-B (via the AP 1110) and external data network, such as the Internet 1600 and/or the cloud platform 1200. The network devices 1150 may include, for example, a hub, switch, router, virtual switches/router, distributed virtual switch (vSwitch), DHCP server, encrypted tunnel end-point manager and/or any combination thereof.

In some embodiments, at least a subset of the network devices 1150 may be dynamically configured by a software-defined network (SDN) controller. For example, as shown in FIG. 1, a SDN controller 1500 may configure one or more layer-two devices (e.g., switches) or layer-three devices (e.g., routers) in the set of network devices 1150, such that data packets or frames may be routed, processed, and/or blocked at the network devices based on various parameters, such as, but not limited to, the origin or destination of the data, type of data, and/or carrier or enterprise policies. Additionally or alternatively, the SDN controller 1500 may configure at least a subset of the network devices 1150 to provide different qualities of service (QoS) to different UEs based on one or more policies associated with each UE. For example, the SDN controller 1500 may configure the one or more network devices 1150 to ensure that the UE 1120A, which may be associated with a business customer, receives a higher QoS compared with the UE 1120B, which may be associated with a non-business customer.

In some embodiments, the SDN controller 1500 may configure one or more of the network devices 1150 based on data (including, for example, messages, notifications, instructions, measurements, authorizations, approvals, or other information) received from one or more services running in the cloud-based wireless access infrastructure 1000. For example, the SDN controller 1500 may receive instructions on how and which of the network devices 1150 to configure from a service on the cloud platform 1200.

In accordance with the disclosed embodiments, the cloud platform 1200 may communicate with the enterprise network 1300 and/or the IPX 1400. In some embodiments, the cloud platform 1200 may include direct connections to the enterprise network 1300. Alternatively, the cloud platform 1200 may employ indirect connections to communicate with the enterprise network 1300, e.g., using the Internet 1600 (via the network device 1150). For example, the cloud platform 1200 may communicate with the enterprise network 1300 through the Internet 1600 using a tunneling protocol or technology, such as the IPSec protocol, or may communicate with an LTE EPC node (not shown) of another carrier via the IPX 1400 using one or more standardized interfaces, such as the Gy, Gz, Gx and Sha interfaces as defined in the LTE standard.

Figure 2:
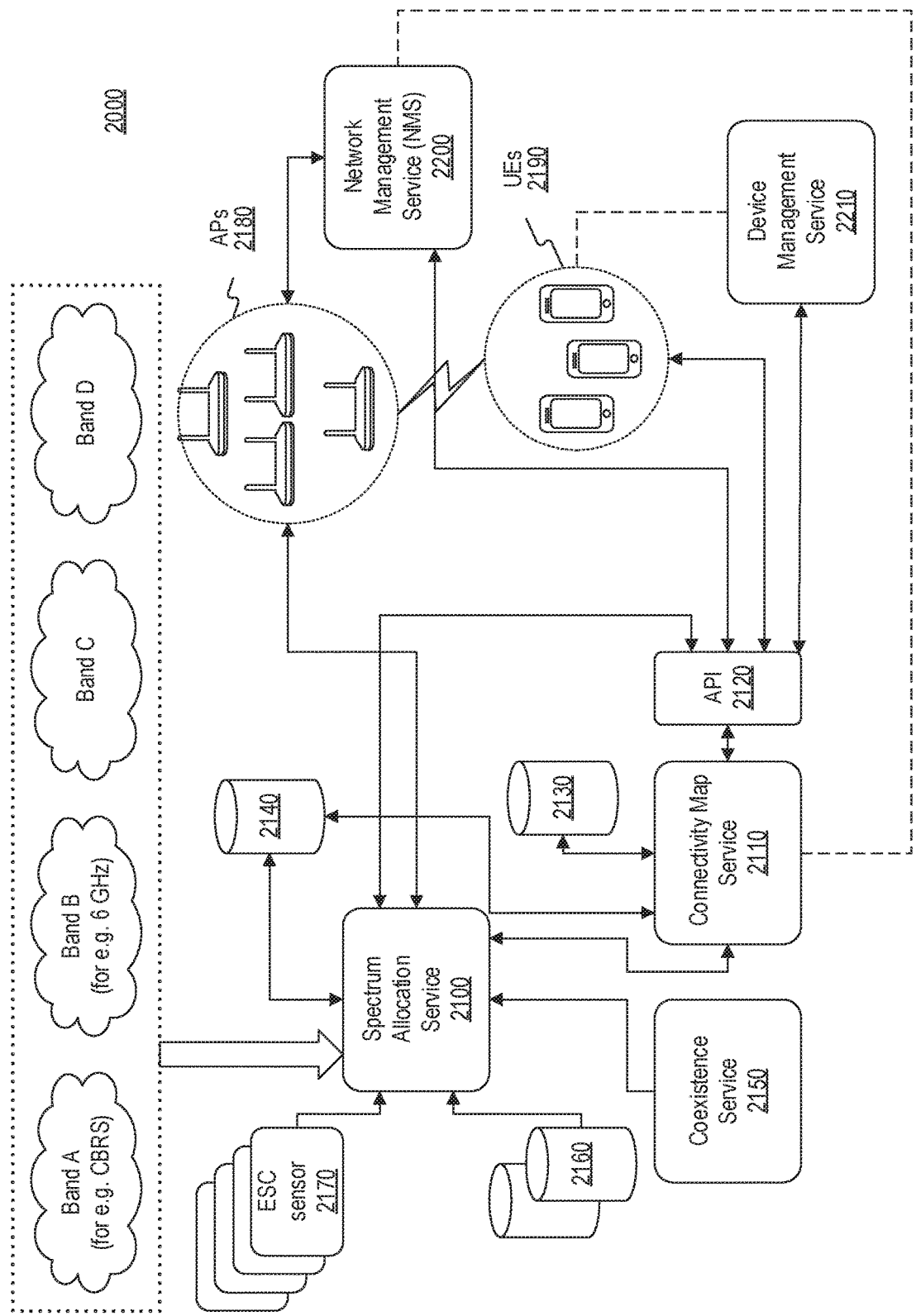
FIG. 2 illustrates a schematic block diagram of an exemplary system for providing a connectivity map in accordance with the disclosed embodiments.

FIG. 2 illustrates a schematic block diagram of an exemplary system 2000 for providing a connectivity map in accordance with the disclosed embodiments. As shown in FIG. 2, system 2000 may comprise a spectrum allocation service (SAS) 2100. SAS 2100 may be a centralized entity that provides spectrum management and allocation in a wireless network. SAS 2100 may accept input obtained from multiple sources and provide guidance to a network of APs in terms of how requested content may be served using available spectrum. In some embodiments, the APs may include, for example, base stations, gateways, or other network nodes located at an edge of the wireless network in communication with content-delivery servers.

In some embodiments, SAS 2100 may receive inputs from one or more sources. For example, SAS 2100 may receive content service requests from one or more entities in the network, such as from one or more APs 2180 in the network. SAS 2100 may also receive inputs, such as analytics-based guidance, demographics guidance, geography or location based guidance, SLA enforcement criteria, QoS guidance, propagation-related constraints, resource and capacity availability, service constraints, or any combination thereof from one or more sources in the network. SAS 2100 may use the received input(s) to allocate frequency channels and/or blocks of available spectrum for different content transmitted over a wireless access network. As shown in FIG. 2, SAS 2100 may coordinate and manage access to multiple spectrum bands, such as Band A ("CBRS band at 3.5 GHz"), Band B ("6 GHz band"), Band C, and Band D. In other embodiments, SAS 2100 may coordinate and manage access to more or less than four spectrum bands.

In some embodiments, system 2000 may comprise one or more sensors 2170 to monitor which frequency channels are in use by incumbent users and report any detected spectrum usage to SAS 2100. Sensor 2170 may comprise, for example, environmental sensing capability (ESC) sensors that can detect the presence of a federal incumbent shipborne radar in order to protect it from harmful interference. Accordingly, sensor 2170 may detect dynamic incumbent activity and send dynamic incumbent activity information to SAS 2100 for use in allocating spectrum in the shared spectrum band.

In some embodiments, system 2000 may further comprise one or more static incumbent external database or databases 2160. Database 2160 may be configured to store information associated with incumbent systems or users, such as presence of incumbent systems and parameters associated with the incumbent systems. For example, database 2160 may be configured to store spectrum usage information by incumbent systems. Information stored in database 2160 may be updated periodically.

System 2000 may also comprise a coexistence service 2150. Coexistence service 2150 may be configured to manage inter-radio interference. For example, when two or more APs share resources in a shared spectrum, coexistence service 2150 may be configured to detect the presence of two more radios or APs in a shared spectrum and transmit this information to SAS 2100. SAS 2100 may be configured to use information from coexistence service 2150 in order to optimally allocate frequency channels to the APs.

In other embodiments, system 2000 may comprise an AP state database 2140. Database 2140 may be configured to store information associated with one or more APs 2180 in a wireless access network. In some embodiments, APs 2180 may be implemented as AP 1110 of FIG. 1. As used herein, APs 2180 may be entities configured to provide network accessibility to one or more UEs 2190 in the wireless access network. APs 2180 may provide, for example, authentication services that enable users to access information or services on a remote server, and may also provide other functions, services, and/or applications to users of the UEs 2190. In addition, APs 2180 may be configured to provide data associated with APs 2180 to at least one of SAS 2100 or Network Management Service (NMS) 2200. SAS 2100 may be configured to process data associated with APs 2180 and/or store data, such as state information, associated with APs 2180 in database 2140.

Exemplary types of state information associated with APs 2180 that may be received and stored by SAS 2100 in database 2140 may include, but are not limited to, spectrum request history, current spectrum usage, nature of spectrum allocation, and/or spectrum denial history. Spectrum request history may include information, such as an amount of spectrum requested over a specified, prior time interval. In some embodiments, current spectrum usage may include the current bandwidth allocation associated with each of the APs 2180. In other embodiments, SAS 2100 may receive and store information related to the nature of spectrum usage and/or allocation associated with the APs 2180, such as whether the spectrum allocation is contiguous or fragmented. In some embodiments, SAS 2100 may receive and store information related to spectrum denial history, including the number of times a spectrum allocation request associated with the APs 2180 was denied, e.g., by SAS 2100.

Databases 2160, 2140, and/or 2130 may include Microsoft SQL databases, SharePoint databases, Oracle™ databases, Sybase™ databases, or other relational databases or Cloud databases (such as AWS DynamodB, mongoDB etc.). Databases 2160, 2140, and/or 2130 may be implemented using any volatile or non-volatile memory including, for example, magnetic, semiconductor, tape, optical, removable, non-removable, or any other types of storage devices or computer-readable mediums.

As used herein, users may operate respective UEs 2190, such as smartphones, tablets, computers, or other computing devices, to access a wireless access network through a network node, such as APs 2180. The UEs 2190 may include personal-computing devices such as, for example, general purpose computers, special purpose computers, laptop computers, notebook computers, mobile devices, tablets, smartphone, wearable devices, Internet of things (IoT), and any other computing devices that may be used to communicate with the APs 2180.

In some embodiments, APs 2180 may be configured to communicate with NMS 2200 to receive and/or send data associated with APs 2180. NMS 2200 may be configured to provide functions and/or services to manage wireless access networks, such as performing fault analysis, managing performance, provisioning of networks, and/or maintaining QoS. For example, NMS 2200 may perform network maintenance, monitor APs 2180, provide status reports, implement upgrades/patches, and perform user administration. In some embodiments, NMS 2200 may be a part of a service running in a public cloud service, such as Amazon Web Services. Additionally or alternatively, NMS 2200 may be extended to private cloud platforms as well as other legacy platforms that have the capability to create programmatic interfaces. NMS 2200 may be configured to ensure robustness against network overload, protection against denial of service attacks, intrusion detection, and various firewall functions. Those skilled in the art will appreciate that NMS 2200 may provide additional or alternative functions and/or services.

As shown in FIG. 2, system 2000 may also comprise a device management service 2210. Device management service 2210 may be configured to source, provision, secure, and manage UEs 2190 to third-party entities. Device management service 2210 may also be configured to provide hardware support (e.g., inventory, provisioning, asset, etc.), software support (e.g., configuration management, software distribution, software updates, etc.), security support (e.g., blacklist, encryption, antivirus, authentication, jailbreak/rooted notification, etc.), and/or network service management for UEs 2190. For example, device management service 2210 may comprise an identity management system that is configured to check for authentication and authorization of an application on UEs 2190 that is requesting information. In some embodiments, the connectivity map service API 2120 may be configured to communicate with the identity management system to authenticate the one or more external entities prior to providing access to the connectivity map. In some embodiments, device management service 2210 may be configured to communicate with connectivity map service API 2120 to provide intelligence information pertaining to available connectivity options to UEs 2190. For example, device management service 2210 may be configured to access connectivity map service API 2210 to access intelligence information pertaining to frequency channel or connectivity options available for UEs 2190. In some embodiments, device management service 2210 may provide services, such as network service management, for UEs 2190 and interact wirelessly with UEs 2190 via the one or more APs 2180. In other embodiments, device management service 2210 may provide services to the UEs through other mechanisms such as a docking station.

According to the embodiments of the present disclosure, system 2000 may further comprise a connectivity map service 2110, a connectivity map service API 2120, and connectivity map database 2130. Connectivity map service 2110 and/or connectivity map service API 2120 may be configured to communicate with one or more entities in system 2000 via a wireless access network, including, but not limited to, SAS 2100, AP state database 2140, connectivity map database 2130, NMS 2200, and/or device management service 2210.

In some embodiments, connectivity map service 2110 may be configured to create and maintain a dynamic connectivity map for each AP 2180 and generate intelligence information around connectivity options that are available real-time or near real-time for every AP 2180 in the wireless access network. In some embodiments, connectivity map service 2110 may be store and update the dynamic connectivity map crated for each AP 2180 in connectivity map database 2130. Accordingly, connectivity map database 2130 may be configured to store and maintain a real-time or near real-time connectivity map for every AP 2180 in the wireless access network that provides dynamic availability of frequency channels or connectivity options for each AP 2180.

In some embodiments, connectivity map service API 2120 may be configured to provide access to the connectivity maps created and maintained for each AP via secure and scalable access. For example, as shown in FIG. 2, internal applications, such as SAS 2100, and external applications or entities, such as device management service 2210 and NMS 2200, may be able to access the connectivity maps via connectivity map service API 2120. By way of example, an Identity Management System may be configured to check for authentication and authorization of the applications or entities that is requesting the connectivity map (e.g., SAS 2100, NMS 2200, and/or device management service 2210) prior to providing access to the connectivity map. In other embodiments, the connectivity map service API 2120 may be configured to provide intelligence information beyond the connectivity maps that are created for each AP 2180. For example, the connectivity map service API 2120 may be further configured to provide additional intelligence information, such as spectrum coverage, spectrum capacity, quality of service (QoS) associated with the spectrum, spectrum availability in time and location, spectrum loading, spectrum cost, spectrum reliability, features supported by the spectrum, standards supported by the spectrum, security requirement associated with the spectrum, or authentication requirement associated with the spectrum.

As previously discussed, connectivity map service 2110 may interact with SAS 2100 and, using connectivity map database 2130, may create a connectivity map for every AP or radio 2180 in the wireless access network. Additionally or alternatively, connectivity map service 2110 may also provide, via one or more APIs 2120, secure access to the connectivity map information, for example stored in connectivity map database 2130. By way of example, NMS 2200 that manages the network of APs 2180 and device management service 2210 that manages UEs 2190 connected to the network of APs 2180 may use the connectivity map service API 2120 to obtain information and intelligence information around spectrum availability and, more generally, connectivity options of the APs 2180.

In some embodiments, the connectivity map service 2110 may also include information pertaining to licensed spectrum that the APs 2180 may be capable of operating on. Such information may generally be static since license spectrum deployments do not switch around spectrum assigned to APs 2180 and can be expected to be available to the connectivity map service 2110 via an external database that have this information. As shown in FIG. 2, for example, connectivity map service 2110 may receive this information pertaining to licensed spectrum from NMS 2200. Other examples of how connectivity map service 2110 may be used are provided below.

By way of example, a UE 2190, such as a mobile UE that is encountering a changing network environment, may need to constantly monitor (e.g., radio scan and process) different radio networks in different bands. Constantly monitoring different radio networks in different bands may be time-consuming and may utilize large amounts of battery power and central processing unit (CPU) cycles. The UE 2190 could advantageously use intelligence information to decide which wireless network or networks to connect to. In addition, it is likely that a simple criteria such as wireless signal strength may not be enough to make an optimal system selection. Moreover, the UE 2190 may need to spend resources in terms of CPU cycles and battery power to connect or attach to the network or networks of choice (e.g., network acquisition). While the UE 2190 may have two networks of choice, such as the Wi-Fi network or cellular licensed bands for Internet connectivity, as the number of bands and network choices grow to include shared spectrum networks, the aforementioned tasks will become even more complex, and consume more time, power and CPU cycles. Accordingly, the connectivity map service API 2120 may be used to provide the UE 2190 with the intelligence information regarding which connectivity options are available on APs 2180 near the location of the UE 2190. Therefore, the connectivity map service API 2120 may help the UE 2190 make optimal and timely system selection and network acquisition.

By way of another example, when the UE 2190 is connected to multiple networks via different bands, such as Bands A-D of FIG. 2, the UE 2190 may need to decide which data-path would be the best to serve the application of interest. The UE 2190 may decide to use the best network or data-connection as its data-path for all applications and switch when another data-connection that is better becomes available. The UE 2190 may decide to use the spectrum which enables the most efficient transmission of data. The UE 2190 may also decide to simultaneously use multiple data-connections to form effectively a more robust or more high-capacity combined data-path for all its applications. In some embodiments, the UE 2190 may decide to use a different data-connection for each type of application to better meet the needs of the individual applications. There may be many options in terms of data-path choices to serve different applications. With an increased number of network connections to choose from, for example due to multiple bands supporting multiple networks, more complexity and more scope may be required to help the UE 2190 make the right choices. Accordingly, the connectivity map service API 2120 may provide the UE 2190 with the intelligence information around which connectivity options are available on APs 2180 near the location of the UE 2190, thereby helping the UE 2190 make more optimal and timely data-path selection for its applications.

In some embodiments, when the UE 2190 is moving around or roaming, the UE 2190 may encounter different network connectivity options. When shared spectrum networks operate on multiple bands, such as Bands A-D of FIG. 2, the networks the UE 2190 encounters as it moves around or roams may be significantly different in their capabilities, security requirements, spectrum reliability, etc. In such a scenario, the UE 2190 may need to make choices as to which networks or data-paths the UE 2190 will use. The UE 2190 may also need to consider the different levels of disruption that switching networks or data-paths may have on its applications. Accordingly, the connectivity map service API 2120 may be beneficial for the UE 2190 in making the optimal and timely data-path selection for its applications, especially when the number of bands or networks it can connect to changes as the UE 2190 moves around. By way of example, if the UE 2190 comprises a drone, ubiquitous connectivity may be extremely critical, and thus, a network or connectivity route for the drone may need to be computed (either statically or dynamically) to ensure satisfactory connectivity of the drone's applications to their servers via the Internet.

In other embodiments, when there are many different connectivity options, UEs 2190 may need a central source of intelligence information, such as the connectivity map service 2110, to determine an optimal connectivity strategy proactively rather than reactively. The optimal connectivity strategy, for the time and duration the UEs 2190 need the connectivity, can be made as a function of different criteria such as cost, expected performance of a network (e.g., coverage, capacity), network reliability, or any combination thereof. FIG. 3, for example, illustrates an exemplary intelligence information 3000 associated with a particular AP 2180 that the connectivity map service API 2120 may provide to one or more UEs 2190 such that the one or more UEs 2190 can determine an optimal connectivity strategy. The exemplary intelligence information 3000 may comprise a list of different criteria that the connectivity map service API 2120 may provide.

In some embodiments, one or more UEs 2190 may request intelligence information associated with one or more APs 2180 near the location of the one or more UEs 2190 to the connectivity map service API 2120 (for example, via one or more APs 2180). Upon receiving the request, the connectivity map service API 2120 may provide a response to the one or more UEs 2190, and the response may comprise intelligence information associated with each of the APs 2180 near the location of the one or more UEs 2190.

As shown in FIG. 3, the exemplary intelligence information 3000 may identify the particular AP 3100, the location 3200 of the AP 3100 (e.g., lat./long. or other map coordinates, physical address, etc.), the service provider 3300 associated with the AP 3100, or any other identification information associated with the AP 3100. Intelligence information 3000 may further provide a list of spectrum bands or channels 3400 associated with the AP 3100 (e.g., "Band 1 Channel" and "Band 2 Channel"). Moreover, intelligence information 3000 may include parameters associated with each available spectrum band or channel 3400. The parameters may include, but are not limited to, availability 3410 of the spectrum band or channel 3400 in time and/or location (e.g., current availability, determined availability or predicted availability), authorization or time to availability 3420 (e.g. whether the UE is authorized to use that band channel or when the band channel will be available), coverage or signal strength 3430, capacity or data rate 3440, loading 3450 (e.g., determined loading or predicted loading), QoS support 3460, reliability 3470, radio features support 3480 (e.g., Massive MIMO), standards support 3490, cost 3500 (e.g. what the service provider is charging), security requirements 3510, access requirements 3520 (e.g., what is required for authentication), or other channel service specific information 3530. Capacity or data rate 3440 may comprise maximum capacity in Megabytes per second (MBPS) (e.g., enhanced mobile broadband (emBB) in 5G). QoS support 3460 may comprise support for low latency, real-time application (e.g., uRCC in 5G) or machine-to-machine type communications (e.g., mMTC in 5G). Loading 3450 may indicate, for example, how loaded or busy the channel is. Loading indication 3450, for example, may be as a percentage of the capacity in terms of maximum data-rate or maximum connection count achievable for the specific AP and the specific channel that is already in use (for example, X % capacity already in use). Loading indication may also reflect CPU, Storage, Network Interface Card, and/or similar resource utilization pertaining to the Access Point and associated network infrastructure operating on that channel.

In some embodiments, for a particular location specified in the request to the connectivity map service API 2120, the connectivity map service API 2120 may provide a response with the intelligence information discussed with respect to FIG. 3 for a number of APs within a predetermined radius of the specified location. In some embodiments, the UE 2190 requesting may identify the predetermined radius in the request sent to the connectivity map service API 2120.

In other embodiments, the UE 2190 may specify a location, an application (e.g., a minimum bandwidth, latency, or other QoS requirements), and a duration during which the application is active in a request to the connectivity map service API 2120. The response from the connectivity map service API 2120 may indicate the most optimum connectivity options to use on one or more nearby APs that meets the specified QoS requirements for the specified application during the specified time or duration. The recommended connectivity options in the response may be determined based on one or more criteria, such as best meeting the QoS requirements, minimizing the need to switch between connectivity options, minimizing disruption due to incumbent activity, or other criteria. The underlying algorithm used by the connectivity map service API 2120 to determine the optimal connectivity option that works for the specified application can be formulated in different ways. For example, the underlying algorithm can be formulated as a constrained optimization problem of an appropriate metric, as a neural net, or as another machine-learning algorithm.

In some embodiments, for a UE 2190 that is mobile, a request to the connectivity map service API 2120 may include a requested geographical route, a requested duration, and specified application type(s). A response from the connectivity map service API 2120 may return the connectivity navigation route that best meets the application requirements across different APs and their available connectivity options.

In other embodiments, the power and channels on which one or more APs are authorized to transmit may be updated at very specific times, for example in the case of the CBRS band, for which the power and channels are updated at a set time each day. Accordingly, a UE 2190 may query the connectivity map service API 2120 to obtain the channel and power information for one or more APs for a specified location at a specified time in order to determine, for example, whether the UE 2190 needs to switch APs to improve its throughput. In yet another embodiment, when a Federal radar becomes active, the SAS2100 may move the channel on which an AP is authorized to transmit. Accordingly, the UE 2190 that was connected to the AP on the channel may lose connectivity. Therefore, the UE 2190 may use the connectivity map service API 2120 to gather channel and power information associated with the AP or other APs in its vicinity. Based on the gathered channel and power information, the UE 2190 may immediately switch to a new channel without having to search for authorized channels.

In yet another embodiment, when there is a multitude of different connectivity options and where the traffic, the QoS, and the reliability and the nature of disruption associated with each of the networks are different, it may be more complex to determine the optimal connectivity strategy. Determining the optimal connectivity strategy, for example, may be dependent on many dimensions other than radio frequency (RF) coverage. Accordingly, a machine-learning (ML) algorithm can be used to make optimal connectivity decisions based on predicted behavior of such networks. For example, ML algorithm can be used to predict when certain currently unavailable frequency channels and connectivity options may become available based on historical behavior of one or more APs 2180. The training sets for such ML based algorithms may comprise the historical data available for that channel's usage by the APs or networks operating on that channel in that area. Additionally or alternatively, the training sets may comprise larger data sets from similar areas where the similarity is in terms of general classification criteria (such as urban, suburban or rural) or more specific classification criteria (such as demographics, spatial density of APs etc.). In some embodiments, ML algorithm can provide immediate service or best-effort service depending on a priority level associated with one or more UEs 2190. For example, ML algorithm can provide immediate service to a UE 2190 associated with a high priority level (e.g., primary user) and provide best-effort service to a UE 2190 associated with a low priority level (e.g., secondary user). In other embodiments, ML algorithm can be used to provide a predicted availability schedule for separate frequency channels based on historical data. Additionally or alternatively, ML algorithm can provide a prediction with respect to QoS of spectrum bands or channels at different times of the day for different APs 2180 based on historical data.

Figure 4:
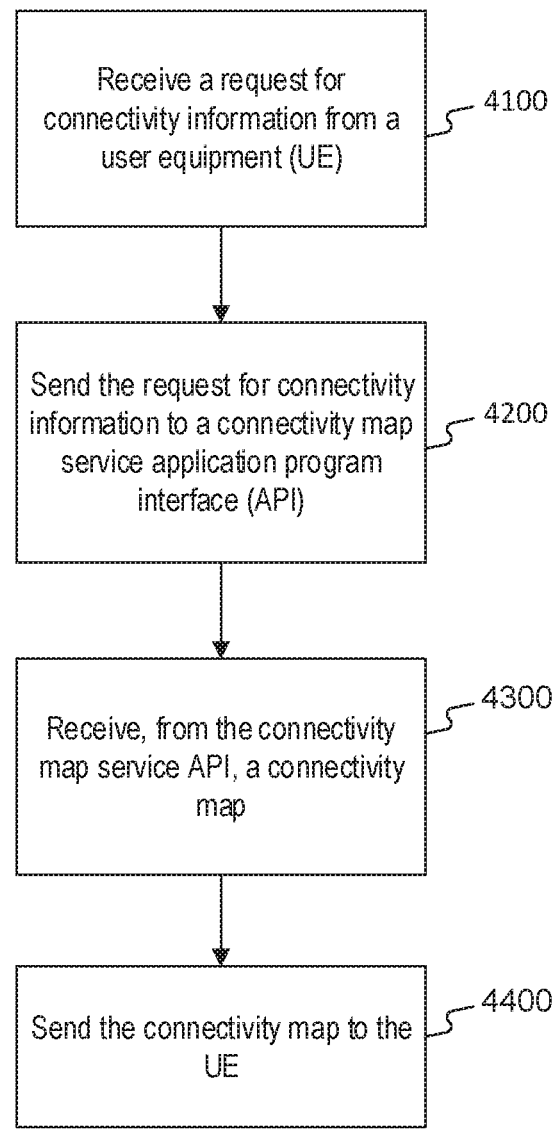
FIG. 4 is a flow diagram of an exemplary method for providing a connectivity map in accordance with the disclosed embodiments.

Referring now to FIG. 4, a flow diagram illustrating an exemplary method 4000 for providing a connectivity map is disclosed. Method 4000 begins at block 4100, at which an AP, such as AP 2180, receives a request for connectivity information from a UE 2190 connected to AP 2180. The request for connectivity information may comprise a request for connectivity options or a request for channel availability from the UE 2190. After receiving the request, method 4000 may proceed to block 4200. At block 4200, AP 2180 may send the request for connectivity information to a connectivity map service API, such as the connectivity map service API 2120. As previously discussed, connectivity map service 2110 may create and maintain a connectivity map per AP, as well as intelligence information pertaining to connectivity options available for every AP in the wireless access network. Accordingly, connectivity map service API 2120 may access the connectivity map created and maintained from either connectivity map service 2110 or connectivity map database 2130 and send the connectivity map associated with AP 2180. In some embodiments, connectivity map service API 2120 may send one or more connectivity maps associated with one or more APs 2180 within a predetermined radius from the location of the requesting UE 2190. In other embodiments, the connectivity map may be generated using a location and state information associated with one or more APs 2180 stored in database 2140. In some embodiments, the location may be a location of the AP 2180 or a remote location that is different from a location of UE 2190. In some embodiments, the connectivity map may comprise a list of available spectrum or available frequency channels and one or more parameters associated with each available spectrum or channel.

Method 4000 may proceed to block 4300, at which AP 2180 may receive the connectivity map from the connectivity map service API 2120. After receiving the connectivity map, method 4000 may proceed to block 4400, at which AP 2180 may send the connectivity map to the requesting UE 2190 in response to the request for connectivity information. The connectivity map may be used to select at least one of an optimal network, an optimal data-path, an optimal network route, or an optimal connectivity strategy for the UE 2190.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps, or performing non-dependent steps in parallel. It is intended, therefore, that the specification and examples be considered as illustrative only, with a true scope and spirit being indicated by the following claims and their full scope of equivalents.

What is claimed is:

1. A method for providing a connectivity map to a user equipment (UE) in a wireless network, the method comprising:
   receiving a request for connectivity information from the UE;
   sending the request for connectivity information to a connectivity map service application program interface (API);
   receiving, from the connectivity map service API, a connectivity map, wherein:
      the connectivity map is generated using a location and state information associated with one or more nearby APs stored in a database; and
      the connectivity map comprises a list of available spectrum and one or more parameters associated with each available spectrum; and
   sending the connectivity map to the UE in response to the request for connectivity information,
   wherein the connectivity map is used to select at least one of a network, a data-path, a network route, a connectivity strategy, or a spectrum for the UE.

2. The method of claim 1, wherein the connectivity map is a real-time connectivity map for the UE, and wherein the method further comprises:
   updating the list of available spectrum in the connectivity map; and
   storing the updated connectivity map in a connectivity map database.

3. The method of claim 1, wherein:
   the connectivity map service API is configured to provide access to the connectivity map to one or more external entities, and the connectivity map service API is configured to communicate with an identity management system to authenticate the one or more external entities prior to providing access to the connectivity map.

4. The method of claim 3, wherein the one or more separate entities comprises at least one of a network management service entity or a device management service entity.

5. The method of claim 1, further comprising:
receiving, from the connectivity map service API, intelligence information in response to the request for connectivity information; and
sending the intelligence information to the UE.

6. The method of claim 5, wherein the intelligence information comprises spectrum information across multiple shared spectrum bands.

7. The method of claim 5, wherein the intelligence information comprises at least one of spectrum coverage, spectrum capacity, quality of service (QoS) associated with the spectrum, spectrum availability in time and location, spectrum loading, spectrum cost, spectrum reliability, one or more features supported by the spectrum, one or more standards supported by the spectrum, security requirement associated with the spectrum, or authentication requirement associated with the spectrum.

8. The method of claim 1, wherein the connectivity map service API is configured to compute a connectivity route for the UE.

9. The method of claim 1, wherein the connectivity map service API is configured to predict, using a machine learning algorithm, availability schedule for one or more spectrums based on historical behavior of one or more UEs using the one or more spectrums.

10. The method of claim 1, wherein the connectivity map service API is configured to predict, using a machine learning algorithm, quality of service (QoS) associated with one or more spectrums at different times based on historical data associated with the one or more spectrums.

11. The method of claim 1, wherein the connectivity map service API is configured to provide, using a machine learning algorithm, immediate service or best-effort service based on a priority level associated with the UE.

12. The method of claim 1, wherein the location used to generate the connectivity map is different from a location of the UE.

13. A system for providing a connectivity map to a user equipment (UE) in a wireless network, the system comprising:
a memory storing instructions; and
a processor configured to execute the instructions to:
receive a request for connectivity information from the UE;
send the request for connectivity information to a connectivity map service application program interface (API);
receive, from the connectivity map service API, a connectivity map, wherein:
the connectivity map is generated using a location and state information associated with one or more nearby APs stored in a database; and
the connectivity map comprises a list of available spectrum and one or more parameters associated with each available spectrum; and
send the connectivity map to the UE in response to the request for connectivity information,
wherein the connectivity map is used to select at least one of a network, a data-path, a network route, a connectivity strategy, or a spectrum for the UE.

14. The system of claim 13, wherein the connectivity map is a real-time connectivity map for the UE, and wherein the processor is further configured to execute the instructions to:
store the connectivity map in a connectivity map database; and
update the list of available spectrum in the connectivity map.

15. The system of claim 13, wherein:
the connectivity map service API is configured to provide access to the connectivity map to one or more external entities, and
the connectivity map service API is configured to communicate with an identity management system to authenticate the one or more external entities prior to providing access to the connectivity map.

16. The system of claim 15, wherein the one or more separate entities comprises at least one of a network management service entity or a device management service entity.

17. The system of claim 13, wherein the processor is further configured to execute the instructions to:
receive, from the connectivity map service API, intelligence information in response to the request for connectivity information; and
send the intelligence information to the UE.

18. The system of claim 17, wherein the intelligence information comprises spectrum information across multiple shared spectrum bands.

19. The system of claim 17, wherein the intelligence information comprises at least one of spectrum coverage, spectrum capacity, quality of service (QoS) associated with the spectrum, spectrum availability in time and location, spectrum loading, spectrum cost, spectrum reliability, supported feature associated with the spectrum, standard support associated with the spectrum, security requirement associated with the spectrum, or authentication requirement associated with the spectrum.

20. The system of claim 13, wherein the connectivity map service API is configured to compute a connectivity route for the UE.

21. The system of claim 13, wherein the connectivity map service API is configured to predict, using a machine learning algorithm, availability schedule for one or more spectrums based on historical behavior of one or more UEs using the one or more spectrums.

22. The system of claim 13, wherein the connectivity map service API is configured to predict, using a machine learning algorithm, quality of service (QoS) associated with one or more spectrums at different times based on historical data associated with the one or more spectrums.

23. The system of claim 13, wherein the connectivity map service API is configured to provide, using a machine learning algorithm, immediate service or best-effort service based on a priority level associated with the UE.

24. The system of claim 13, wherein the location used to generate the connectivity map is different from a location of the UE.

* * * * *